United States Patent Office 3,483,131
Patented Dec. 9, 1969

3,483,131
COMPLEXES OF DIHYDROXY BENZENES WITH SALICYLIDENE ANILINES
Joseph E. Kovacic, St. Paul, Minn., assignor to Sperry Rand Corporation, New York, N.Y., a corporation of Delaware
No Drawing. Filed Apr. 25, 1967, Ser. No. 633,429
Int. Cl. C09k 1/02
U.S. Cl. 252—301.2          4 Claims

ABSTRACT OF THE DISCLOSURE

The photochromic salicylidene anilines, i.e., salicylidene aniline and substituted salicylidene anilines, have their photochromic properties influenced when admixed or complexed with a dihydroxy benzene, such as catechol, hydroquinone and resorcinol. Salicylidene aniline, a photochromic material, can be inactivated or rendered non-photochromic by the addition thereto of hydroquinone in substantially 1:1 mol ratio. Upon the addition of resorcinol in substantially 1:1 mol ratio to salicylidene aniline the resulting material is no longer photochromic but only fluorescent. Salicylidene aniline, however, when only contaminated with hydroquinone or with catechol remains photochromic upon exposure to ultraviolet (UV) radiation. Further, salicylidene aniline when contaminated with resorcinol, such as an amount wherein resorcinol comprises only a minor amount of the resulting admixture, such as an admixture having a salicylidene aniline to resorcinol content in the mol ratio as high as 200:1, is both photochromic and fluorescent upon exposure to ultraviolet radiation.

BACKGROUND OF THE INVENTION

Photochromic materials, and particularly materials which are both photochromic and fluorescent upon exposure to ultraviolet (UV) radiation, are useful in displays and memory systems. Fluorescence is essentially an instantaneous phenomenon whereas photochromism is not.

A photochromic material usually exists in two possible states, a ground state (yellow for salicylidene aniline) and an activated state after exposure to radiation, such as ultraviolet (UV) radiation (usually orange to red). In the case of photochromic material which is also fluorescent, even in the colored, activated state, fluorescence would be maintained but only as long as radiation (UV) exposure is continued.

Although photochromic materials are known and although fluorescent materials are known, it is useful to provide materials which are both photochromic and fluorescent. It is also useful to provide techniques for influencing the photochromic properties of known photochromic materials, such as techniques useful for making a photochromic material both photochromic and fluorescent.

Accordingly, it is an object of this invention to provide a material, and method of preparing the same, which is both photochromic and fluorescent under ultraviolet (UV) radiation.

It is also an object of this invention to provide a technique for influencing the photochromic properties of normally photochromic materials.

SUMMARY OF THE INVENTION

In accordance with this invention it has been found that dihydroxy benzenes, such as catechol, hydroquinone and resorcinol, when admixed with a photochromic salicylidene aniline, influence the photochromic properties of the salicylidene aniline. More particularly, it has been discovered that when salicylidene aniline is admixed or complexed with hydroquinone in substantially 1:1 mol ratio the resulting admixture is no longer photochromic. It has also been found that when salicylidene aniline is admixed or complexed with catechol in substantially 1:1 mol ratio the resulting material is still photochromic. However, when salicylidene aniline is admixed or complexed with resorcinol in substantially 1:1 mol ratio the resulting material is no longer photochromic but is fluorescent only.

On the other hand, when a small, e.g., contaminating or substantially less than molar, amount of a dihydroxy benzene, such as catechol, hydroquinone and resorcinol, is admixed with salicylidene aniline, the resulting admixture possesses photochromic properties. In the instance, however, when a small amount of resorcinol is added to salicylidene aniline, such as an admixture containing salicylidene aniline and resorcinol in the mol ratio of 200:1, respectively, the resulting material not only is photochromic but also fluorescent upon exposure to ultraviolet radiation, and interesting and useful combination of properties.

Almost all of the salicylidene anilines, i.e., salicylidene aniline and the substituted salicylidene anilines, are known to be photochromic in a Nujol (mineral oil) glass at liquid nitrogen temperatures. Also, many of the crystalline substituted salicylidene anilines are photochromic in the crystalline state at room temperature. These include the substituted salicylidene anilines having the structure

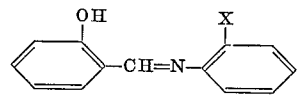

wherein X is an alkyl group, such as a $C_1$–$C_5$ alkyl group, a halogen atom, such as F, Cl, Br or I, or an $NO_2$ group, and others, and the substituted salicylidene anilines having the structure

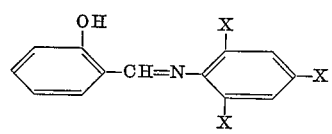

wherein X is H or an alkyl group, such as a $C_1$–$C_5$ alkyl group, a halogen atom, such as F, Cl, Br or I, or a combination thereof, such as salicylidene-2′,6′-dichloroaniline and salicylidene-2′,4′,6′-trichloroaniline. When it is considered that complex formation occurs between salicylidene aniline and a dihydroxy benzene, as indicated by changes occurring in the infra-red spectra in the OH and $C=N$ stretching regions, the same type of complexation could occur between the dihydroxy benzene and any substituted salicylidene aniline.

The following examples are illustrative of the practice of this invention and indicative of the advantages obtainable in the practice of this invention.

EXAMPLE 1

Mixtures made up of 1:1 mol ratio of salicylidene aniline and a dihydroxy benzene, viz. catechol, hydroquinone and resorcinol, were prepared by dissolving these materials in ethanol and then evaporating the solvent ethanol. The resulting residues were then exposed to ultraviolet radiation. The residue or complex comprising salicylidene aniline and hydroquinone in substantially 1:1 mol ratio was inactive and did not exhibit protochromic properties. The residue or complex made up of salicylidene aniline and catechol in substantially 1:1 mol ratio was photochromic upon exposure to ultraviolet radiation. However, the residue or complex made up of salicylidene aniline and resorcinol in substantially 1:1 mol ratio upon exposure to ultraviolet light was fluorescent only and was not photochromic.

EXAMPLE 2

Salicylidene aniline and a dihydroxy benzene, viz. catechol, hydroquinone and resorcinol, in substantially 1:1 mol ratio were dissolved in a minimum amount of ethanol. After the admixtures were heated to 60° C. the solutions were cooled in an ice bath and the resulting precipitated crystals were removed by filtration. Since salicylidene aniline is less soluble in ethanol than the above-identified dihydroxy benzenes, the crystals which were recovered were predominantly salicylidene aniline contaminated with a small amount, e.g., below about 1–5% by weight, of dihydroxy benzene. Upon exposure of the recovered crystals to ultraviolet radiation the following results were observed. The salicylidene aniline crystals contaminated with hydroquinone were photochromic but exhibited no fluorescence. Similarly, the recovered salicylidene aniline crystals contaminated with catechol were photochromic but exhibited not fluorescence. However, the salicylidene aniline crystals with resorcinol upon exposure to ultraviolet radiation were both photochromic and fluorescent.

EXAMPLE 3

Weighed amounts of salicylidene aniline and resorcinol were employed to yield an admixture comprising salicylidene aniline and resorcinol in the mol ratio of about 200:1, respectively. The resulting admixture upon exposure to ultraviolet radiation was found to be photochromic and fluorescent. The resorcinol content in this admixture is too low to be detected by infra-red analysis.

Explanatory of the influence of a substantial or molar amount of a dihydroxy benzene upon the photochromic properties of salicylidene aniline, infra-red spectra of 1:1 mol ratio mixtures of salicylidene aniline with a dihydroxy benzene indicate a disruption in the intramolecular hydrogen bonding in the salicylidene aniline and the formation of intermolecular hydrogen bonds between the salicylidene aniline and the dihydroxy benzene, i.e., complex formation occurring between the salicylidene aniline and the dihydroxy benzene. This was concluded because of changes in the O-H stretching region and the $C=N$ stretching region.

As will be apparent to those skilled in the art in the light of the foregoing disclosure, many modifications, alterations and changes are possible in the practice of this invention without departing from the spirit or scope thereof.

I claim:

1. A photochromic and fluorescent material comprising a salicylidene aniline and a minor amount, below about 5% by weight, of resorcinol.

2. A material in accordance with claim 1 wherein the salicylidene aniline is the compound salicylidene aniline.

3. A material both photochromic and fluorescent upon exposure to ultraviolet radiation in accordance with claim 1 consisting essentially of the compound salicylidene aniline and resorcinol, the molar ratio of the salicylidene aniline to resorcinol present in said material being up to about 200:1.

4. A material both photochromic and fluorescent upon exposure to ultraviolet radiation in accordance with claim 1 consisting essentially of the compound salicylidene aniline and a minor, contaminating amount of resorcinol, in an amount below about 1% by weight, said amount of resorcinol being effective to maintain the photochromic properties of the salicylidene aniline and to impart ultraviolet fluorescence to the resulting material.

References Cited

Becker et al.: J. Am. Chem. Soc. 89 (1967) p. 1298.

Dement, J.: Fluorochemistry, Chemical Publishing Co., Brooklyn, N.Y., 1945, pp. 144–5 and 199.

TOBIAS E. LEVOW, Primary Examiner

A. P. DEMERS, Assistant Examiner

U.S. Cl. X.R.

260—566